(12) United States Patent
Pavlik et al.

(10) Patent No.: US 9,652,221 B2
(45) Date of Patent: May 16, 2017

(54) RUNTIME PATCHING OF AN OPERATING SYSTEM (OS) WITHOUT STOPPING EXECUTION

(71) Applicant: Micro Focus Software Inc., Wilmington, DE (US)

(72) Inventors: Vojtech Pavlik, Prague (CZ); Jiri Kosina, Prague (CZ)

(73) Assignee: Micro Focus Software Inc., Wilmington, DE (US)

(*) Notice: Subject to any disclaimer, the term of this patent is extended or adjusted under 35 U.S.C. 154(b) by 25 days.

(21) Appl. No.: 14/867,819

(22) Filed: Sep. 28, 2015

(65) Prior Publication Data

US 2016/0019055 A1    Jan. 21, 2016

Related U.S. Application Data

(63) Continuation of application No. 14/134,026, filed on Dec. 19, 2013, now Pat. No. 9,170,803.

(51) Int. Cl.

| G06F 9/44 | (2006.01) |
|---|---|
| G06F 9/445 | (2006.01) |
| G06F 9/30 | (2006.01) |
| G06F 9/455 | (2006.01) |
| G06F 9/50 | (2006.01) |
| G06F 9/54 | (2006.01) |

(Continued)

(52) U.S. Cl.
CPC .............. G06F 8/67 (2013.01); G06F 9/3009 (2013.01); G06F 9/30043 (2013.01); G06F 9/441 (2013.01); G06F 9/45554 (2013.01); G06F 9/45558 (2013.01); G06F 9/5088 (2013.01); G06F 9/545 (2013.01); G06F 12/0833 (2013.01); G06F 12/128 (2013.01); G06F 2009/45562 (2013.01); G06F 2009/45591 (2013.01); G06F 2212/62 (2013.01)

(58) Field of Classification Search
CPC .......... G06F 8/67; G06F 8/65; G06F 9/30043; G06F 9/3009; G06F 9/45554; G06F 9/45558
USPC ......................................... 717/168, 169, 111
See application file for complete search history.

(56) References Cited

U.S. PATENT DOCUMENTS 7,130,951 B1 * 10/2006 Christie ................ G06F 9/4812
                                                            710/261
7,849,457 B1    12/2010 Pulido
(Continued)

OTHER PUBLICATIONS

"Linux on-the-fly kernel patching without LKM", [Online]. Retrieved from the Internet: <URL: http://www.phrack.org/issues.html?issue=58&id=7>, (Dec. 12, 2001), 75 pgs.
(Continued)

*Primary Examiner* — Anna Deng
(74) *Attorney, Agent, or Firm* — Schwegman Lundberg & Woessner, P.A.

(57) ABSTRACT

Techniques for runtime patching of an OS without stopping execution of the OS are presented. When a patch function is needed, it is loaded into the OS code. Threads of the OS that are in kernel mode have a flag set and a jump is inserted at a location of an old function. When the old function is accessed, the jump uses a trampoline to check the flag, if the flag is set, processing returns to the old function; otherwise processing jumps to a given location of the patch. Flags are unset when exiting or entering the kernel mode.

17 Claims, 3 Drawing Sheets

(51) Int. Cl.
　　　G06F 12/0831　　(2016.01)
　　　G06F 12/128　　　(2016.01)

(56) References Cited

U.S. PATENT DOCUMENTS

| | | | |
|---|---|---|---|
| 7,962,736 B1 | 6/2011 | Polyudov | |
| 8,607,208 B1 * | 12/2013 | Arnold | G06F 8/67 717/129 |
| 2003/0070162 A1 | 4/2003 | Oshima et al. | |
| 2015/0178071 A1 | 6/2015 | Pavlík et al. | |

OTHER PUBLICATIONS

"Oracle:Ksplice—Rebooting is obsolete!", [Online]. Retrieved from the Internet: <URL: http://www.ksplice.com/>, (Accessed Dec. 16, 2013), 1 pg.

Cesare, Silvio, "Runtime kernel kmem patching", [Online]. Retrieved from the Internet: <URL: http://althing.cs.dartmouth.edu/local/vsc07.html>, (Nov. 1998), 13 pgs.

Chen, Haibo, et al., "Polus: A POwerful Live Updating System", ICSE '07 Proceedings of the 29th International Conference on Software Engineering, (2007), 271-281.

U.S. Appl. No. 14/134,026, filed Dec. 19, 2013, Runtime Patching of an Operating System (OS) Without Stopping Execution.

* cited by examiner

RUNTIME PATCHING OF AN OPERATING SYSTEM (OS) WITHOUT STOPPING EXECUTION

This application is a continuation of U.S. patent application Ser. No. 14/134,026, filed on Dec. 19, 2013, which is incorporated herein by reference in its entirety.

BACKGROUND

Most processing devices have some form of an Operating System (OS). A typical OS has two-modes of operation: a user-mode of operation, and a kernel-mode of operation.

The kernel-mode of operation: has unrestricted access to the underlying hardware for the device on which it processes; can access every available memory address with pretty much unrestricted access; and can execute any processor instructions associated with the device on which the OS operates.

The user-mode of operation is the primary mode where users access and perform operations via applications, but these operations have limited ability to access memory or directly access underlying hardware. Operations in user-mode use Application Programming Interface (API) system calls, some of which can process in kernel-mode (using kernel operations) to perform needed hardware operations and memory accesses where user access is restricted.

During operation of a processing device, the user's processes will jump in and out of user-mode and kernel-mode based on API system calls.

So, when an OS kernel is patched a reboot is typically required of the processing device (such as a server having multiple processors). The reboot ensures consistency between processes jumping in an out of the kernel-mode by stopping all processes. So, a reboot can be a costly and disruptive operation, which is hard to schedule particularly when many parties, via independent devices, depend on the server to be available. Moreover, processors for devices being serviced by the server have to be stopped and usually for a non-trivial extended period of time. Some other approaches can achieve a patch without a reboot; these solutions typically stop all processors running the OS while the patch takes place to ensure consistency. So, either approach necessitates stopping the processors of the OS to install a patch, which makes the OS unavailable to users during the patching process.

It is noted the problem also exists with standalone devices and not just multi processors of a server. For example, many users will attest to the frustration with updating their phone OS because during the update their phones are completely unusable. The same holds true for set-top boxes, tablets, laptops, computer desktops and the like.

SUMMARY

Various embodiments of the invention provide techniques for runtime patching of an OS without stopping execution of the OS.

In an embodiment, a method for runtime patching of an OS without stopping execution of the OS is presented. Specifically, a patch function for an existing function is loaded within a kernel of an Operating System (OS). Next, a flag is set for each kernel thread active within the Operating System (OS). Then, each flag is unset when any OS thread enters the kernel or when any OS thread exits the kernel. Finally, each flag for each kernel thread that attempts to execute the existing function is inspected and when that flag is set, pass that kernel thread to the existing function for execution but when that flag is unset, pass that kernel thread to the patch function without halting the OS.

DETAILED DESCRIPTION

A "resource" includes a user, service, system, device, directory, data store, groups of users, a Virtual Machine (VM), a cloud, combinations and/or collections of these things, etc. A "principal" is a specific type of resource, such as an automated service or user that at one time or another is an actor on another principal or another type of resource. A designation as to what is a resource and what is a principal can change depending upon the context of any given network transaction. Thus, if one resource attempts to access another resource, the actor of the transaction may be viewed as a principal. Resources can acquire and be associated with unique identities to identify unique resources during network transactions.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," "virtual environment," "virtual machine (VM)," and the term "cloud" may be used interchangeably and synonymously herein.

A "server" refers to a network device that manages multiple client machines (processing devices—can be multiple VMs on a single client machine), the server can have multiple processors and memory.

Various embodiments of this invention can be implemented in existing network architectures and devices having an OS.

Also, the techniques presented herein are implemented in machines, such as processor or processor-enabled devices (hardware processors). These machines are configured and the memories programmed to specifically perform the processing of the methods and systems presented herein. Moreover, the methods and systems are implemented and reside within memory and/or a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

Finally, although the techniques presented herein can be implemented in any OS, in an embodiment, the techniques are implemented within a Linux, SUSE®, or Android® OS.

Figure 1:
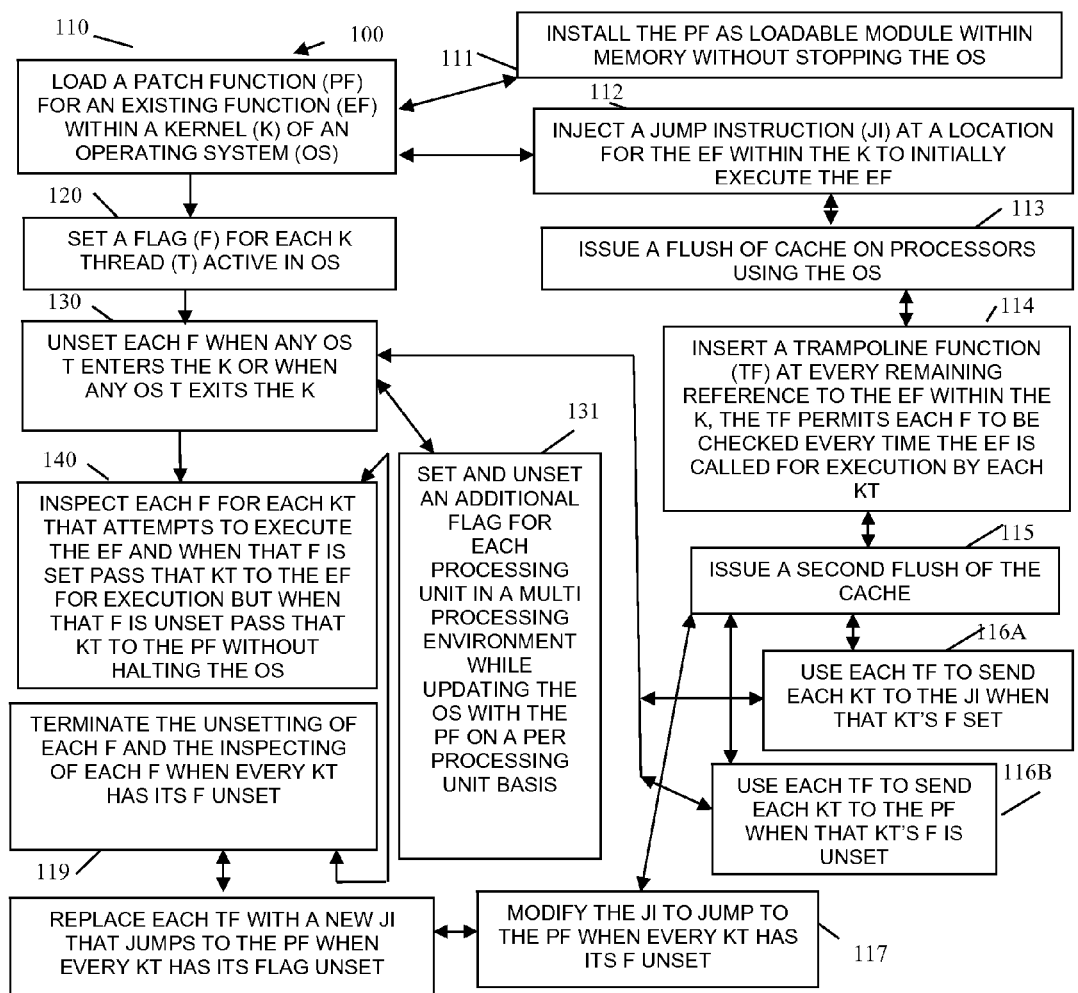
FIG. 1 is a diagram of a method for runtime patching of an OS without stopping execution, according to an example embodiment presented herein.
Figure 2:
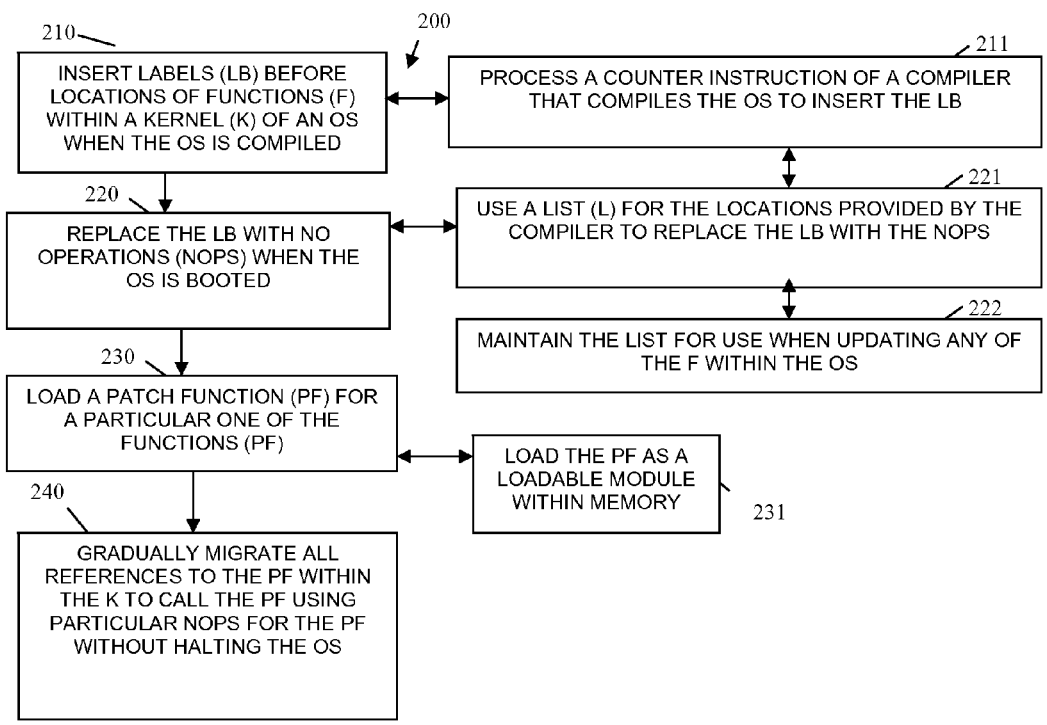
FIG. 2 is a diagram of another method for runtime patching of an OS without stopping execution, according to an example embodiment.
Figure 3:
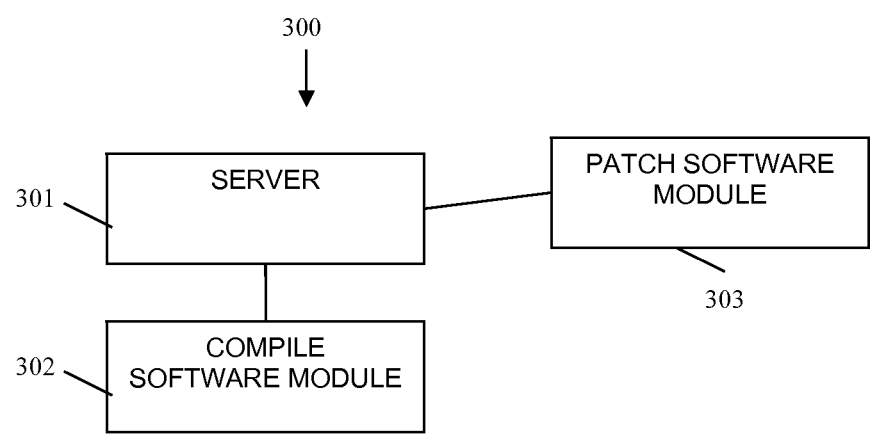
FIG. 3 is a diagram of a runtime patching OS system, according to an embodiment.

It is within this context that embodiments of the invention are now discussed within the context of the FIGS. 1-3.

FIG. 1 is a diagram of a method 100 for runtime patching of an OS without stopping execution, according to an example embodiment presented herein. The software module(s) that implement the method 100 are herein after referred to as "runtime OS patch manager." The runtime OS patch manager is implemented, programmed, and resides as executable instructions within memory and/or a non-transitory machine-readable storage medium that executes on one or more processors of a device and is operational over a network. The network may be wired, wireless, or a combination of wired and wireless. In an embodiment, the device executes the OS patch manager is a multiprocessor server.

As will be demonstrated more completely herein and below, the runtime OS patch manager permits automatic patching of kernel functions in a kernel-mode of operation within an OS without having to stop or halt the kernel and without having to check whether any code is executing within the patched address space.

The consistency of operations is maintained within the kernel for threads (processes). Once a thread enters or exits kernel-mode for or to user-mode that thread is transitioned to the patched kernel function when it re-enters kernel-mode.

Initially, a profiling infrastructure is used to have a compiler inject a counter instruction at the beginning of each function in the kernel. For example, a "mcount" operation can be used. In addition, the compiler produces a list of all counter instruction locations in the resulting binary for the kernel.

Then, the kernel, upon boot, self-patches and replaces these counter instructions with NOP (no-operation) instructions using the compiler provided list of locations. This is done because the counters are not used and the "mcount" infrastructure is (ab)used to just provide space and a list of locations for the NOPs.

Then, when a desired kernel patch for a desired function is loaded as a loadable module, the kernel sets a flag on each process (thread) and each processor (device), the flag referred to as "patching in progress."

Next, the kernel, for each of the patched functions does the following:

1. Sets an INT3 (interrupt) exception handler to jump right after the NOP area in the function.
2. Replaces the first NOP instruction with an INT3 instructions and uses an IPI (inter-processor interrupt) to flush instruction caches on other processors (Central Processing Units (CPUs) and other processing devices having processors).
3. Replaces the remaining NOP instructions with an address of a trampoline function that checks the "patching in progress" flag and either jumps back right after the NOP area (if set) or jumps to the updated function located elsewhere in memory (if unset) and sends an IPI to flush instruction caches again.
4. Replaces the INT3 instruction with a JMP (jump instruction) and uses an IPI to flush instruction caches for the third time.

In a similar manner (same sequence of steps, same NOP patching, and IPIs), code gets added to kernel entry/exit points, such that the per-process "patching in progress" flag then gets unset every time a process enters or exits the kernel, when calling a system call. The kernel also schedules a task to run on all processing devices (CPUs) and clear per-CPU "patching in progress" flags. The flag processing is done for consistency within interrupt handlers; in some instances, per CPU flags can be set and unset in addition to per-process flags.

These flags ensure that from the point-of-view of each sequence of execution (processes, interrupts), all the functions change from "old" to "updated" atomically and there cannot be a case when an old function calls a new function or vice versa, which could lead to a system crash.

Once all the flags have cleared, only new code for the patched function is being executed and a similar sequence of replacing instructions can be used to switch from a JMP to the trampoline functions with a JMP directly to the updated functions instead, removing the performance overhead associated with the trampoline.

The processing of the FIG. 1 is now discussed with respect to the runtime OS patch manager using and perhaps expanding on the detail provided above.

The processing of the runtime OS patch manager deals with loading a patch function to a kernel of an OS and then gradually migrating all kernel threads to use the patch function and not the old previous and existing function. Some details provided above illustrate how the OS code is initially prepped to make this happen and those details are elaborated upon in the FIG. 2 that follows the discussion of the runtime OS patch manager. So, the runtime OS patch manager assumes the OS code was previously prepped for its discussion.

At 110, the runtime OS patch manager loads a patch function for an existing function within a kernel of an Operating System (OS). Again, in an embodiment, the OS is Unix Linux, SUSE®, or ANDROID®. The patch function is a function that either has an update or completely replaces some existing function that is actively executing within the kernel of the OS.

According to an embodiment, at 111, the runtime OS patch manager installs the patch function as a loadable module within memory of the device that executes the runtime OS patch manager (such as a multiprocessor server). This is done without stopping or halting the OS.

Continuing with 111 and at 112, the runtime OS patch manager injects a jump instruction (as discussed above) at a location for the existing function within the kernel. The jump instruction is initially configured to simply proceed to the next instruction in the kernel representing the start of the existing function.

In an embodiment, at 113, the runtime OS patch manager issues a flush operation to clear cache on all processors that are using the OS (can be multiple devices, each having multiple processors).

Continuing with 113 and at 114, the runtime OS patch manager inserts a trampoline function at every remaining reference to the existing function within the kernel. This trampoline function permits each flag (discussed at 120 below) to be checked (below at 140) every time the existing function is called for execution by each kernel thread (discussed at 120 below).

Continuing with 114 and at 115, the runtime OS patch manager issues a second flush of cache. This is again for all processors and devices that are using the OS.

In an embodiment, at 116A, the runtime OS patch manager uses each trampoline function to send each kernel thread to the jump instruction when that kernel thread's is set. So, this is an indication that there is a kernel thread that has not exited the kernel since the patch function was loaded into memory. As a result to ensure consistency of operation for this kernel thread it is sent to the existing function in the kernel to the jump instruction inserted at 112 and that jump instruction is still configured to just pass the kernel thread to the existing function.

In another case, at 116B, the runtime OS patch manager uses each trampoline function to send each kernel thread to the location in memory that has the patch function. This is an indication that a kernel thread has either entered the kernel after the patch function was loaded or exited the kernel when the patch function was being loaded and since exited to user mode and is returning to the kernel mode (see 130 below).

Continuing with 115 and at 117, the runtime OS patch manager will eventually modify the jump instruction to jump to the patch function in memory when every existing kernel thread has its flag unset. This means that all kernel threads from this point forward will not have a set flag and are executing the patch function. Moreover, this is done as a precaution since it is apparent at this point that the existing function should no longer be accessed if each kernel thread is executing the patch function.

Continuing with 117 at 118, the runtime OS patch manager replaces each trampoline function with a new jump instruction that jumps to the patch function when every kernel thread has its flag unset. This removes any processing overhead in the OS associated with continually checking flags for threads when there is no longer any need to do so, so performance does not degrade.

Continuing with 118 and at 119, the runtime OS patch manager terminates the processing at 130 (discussed below) when every kernel thread is unset. Essentially, 130 does not need any termination because the processing the processing at 118 took care that 130 will not happen but it is stated here for completeness since 130 is discussed below.

In fact, it is to be noted that the processing at 116A, 116B, and 117-119 occur after the processing at 120 (130) and exists during the processing at 140 as well. So, the FIG. 1 is not intended to impart a particular sequence of operations.

At 120 (occurring before 116A, 116B, and 117-119), the runtime OS patch manager sets a flag for each kernel thread active in the OS. This was discussed above; the flag helps maintain consistency of the kernel threads as the patch function is gradually updated to replace the existing function within the kernel without stopping of halting the OS.

According to an embodiment, the runtime OS patch manager identifies each OS thread as being in kernel mode representing one of the kernel threads or user mode representing a particular OS thread that processes outside the kernel. Threads can move in and out between kernel mode and user mode and are regularly changing within the OS.

At 130, the runtime OS patch manager unsets each flag for each OS thread when any OS thread enters the kernel or when any OS thread exits the kernel. So, when an OS thread moves from kernel mode to user mode, its flag is unset; and at that point in time it becomes a kernel thread. Likewise, when a kernel thread moves from kernel mode to user mode, its flag is unset and at that point in time it is no longer a kernel thread.

In an embodiment, at 131, the OS patch manager may also set and unset (120) an additional flag for each processing unit (CPU, processing device) in a multi-processor device environment while updating the OS with the patch function on a per processing unit basis.

At 140, the runtime OS patch manager inspects each flag for each kernel thread that attempts to execute the existing function and when that flag is set, that kernel thread is passed to the existing function. However, when the flag is unset, that kernel thread is passed to the patch function. This is done without halting the OS.

It is now apparent how a function can be dynamically added to a kernel of an OS without halting, stopping, and/or rebooting the OS. The updated function gradually is updated and eventually becomes a complete replacement for an existing function within the kernel, as was detailed above.

FIG. 2 is a diagram of another method 200 for runtime patching of an OS without stopping execution, according to an example embodiment. The software module(s) that implement the method 200 are herein after referred to as "OS patch controller." The OS patch controller is implemented, programmed, and resides as executable instructions within memory and/or a non-transitory machine-readable storage medium that executes on one or more processors of a machine and is operational over a network. The network may be wired, wireless, or a combination of wired and wireless. In an embodiment, the device that executes the OS patch controller is a multi-processor server.

The OS patch controller describes the prep work done to the OS kernel to permit the techniques discussed with the processing depicted in the FIG. 1.

At 210, the OS patch controller inserts labels before locations of references to functions within a kernel of an OS. This is done when the OS is compiled and can use existing features of the OS to perform this processing on its behalf.

For example, at 211, the runtime OS patch manager processes a counter instruction of a compiler that compiles the OS to insert counters.

Continuing with 211 and at 212, the runtime OS patch manager uses a list for the locations provided by the compiler to assist in the processing of 220 (discussed below) where each label is replaced with a NOP.

Still continuing with 212 and at 213, the runtime OS patch manager maintains the list for use when updating any of the functions within the kernel of the OS.

At 220, the runtime OS patch manager replaces the labels with NOPs when the OS is booted.

At 230, the runtime OS patch manager loads a patch function for a particular one of the functions. That is, a new function (patch function) is replacing an existing function (a particular one of the functions identified at 210).

In an embodiment, at 231, the runtime OS patch manager loads the PF as a loadable module within memory of the device executing the OS (such as a multiprocessor server).

Finally, at 240, the runtime OS patch manager gradually migrates or updates all references to the patch function within the kernel to call the patch function by using the NOPs. Again, this is done without halting or stopping the OS. The details on how the processing of 240 is achieved were discussed at length above with reference to the FIG. 1. By gradually it is meant that the migration or update occurs over some period of time and not all at one time (typical case) until all kernel threads have been securely migrated to use the patch function as detailed in the FIG. 1 above.

FIG. 3 is a diagram of a runtime patching OS system 300, according to an embodiment. The components of the runtime patching OS system 300 are implemented as executable instructions that reside within memory and/or non-transitory computer-readable storage media and those instructions are executed by one or more devices. The components and the devices are operational over a network and the network can be wired, wireless, or a combination of wired and wireless.

According to an embodiment, the runtime patching OS system 300 implements, inter alia, the features of the software module(s) that implement the methods 100 and 200 of the FIGS. 1-2, respectively.

The runtime patching OS system 300 includes a server 301. In some cases, the server 301 may also include a compile software module 302 and a patch software module 303.

The server 301 has memory, one or more processors, and/or non-transitory computer readable storage media. The server 301 is configured to update kernel functions of an OS without halting the OS by gradually over some extended period of time updating or migrating the kernel functions to ensure consistency of operation for threads of the OS that are passing between kernel mode and user mode within the OS.

The details of how the server achieves the gradual update or migration were presented above in the FIG. 1 with the initial prep assistance of the FIG. 2.

The server 301 may also include a compile software module 302 that is programmed in memory and/or a non-transitory computer readable-storage medium for execution on one or more processors of the server 301. The compile software module 302 is configured to label locations for references to the kernel functions during compiles of the OS. Details of this were discussed above at the start of the FIG. 1 and with the FIG. 2.

Additionally, the server 301 may also include a patch software module 303 that is programmed in memory and/or a non-transitory computer readable-storage medium for execution on one or more processors of the server 301. The patch software module 303 is configured to use the label locations provided by the compiled OS, via the compile software module 302, when gradually updating particular ones of the kernel functions with patch functions. The details of this were discussed above with reference to the FIG. 1.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
monitoring threads of an Operating System (OS);
compiling the OS to uniquely label an existing function and a replacement function before the monitoring; and
gradually transitioning the treads from accessing an existing function to accessing a replacement function as the threads enter or exit kernel processing within the OS using labels that identify the existing function and the replacement function without halting the OS, wherein gradually transitioning includes using flags set on each of the threads that are initially set to access the existing function, and each flag is unset for each of the threads when each of the threads enter or exit the kernel processing of the OS, a thread of the threads having an unset flag identifying that said thread is to access the replacement function.

2. The method of claim 1, wherein monitoring further includes installing the replacement function as a loadable module within the OS before the monitoring.

3. The method of claim 1, wherein compiling further includes flushing the cache of processors using the OS before the monitoring.

4. The method of claim 1, wherein flagging further includes directing by the OS any flagged thread to access the replacement function.

5. The method of claim 1, wherein flagging further includes directing by the OS any thread that has not been flagged to access the existing function instead of the replacement function.

6. The method of claim 1, wherein gradually transitioning further includes removing the existing function from the OS when each thread has entered or exited kernel processing.

7. The method of claim 1, wherein gradually transitioning further includes migrating all threads over time to the replacement function without halting the OS, without stopping the OS, and without rebooting the OS.

8. A method, comprising:
compiling a distributed server-based Operating System (OS) to uniquely label an existing function and a patch function of the OS;
initiating the OS on multiple processors of a distributed server;
loading the patch function to the existing function within the OS;
transitioning threads processing within the OS from the existing function to the patch function once any thread transitions enter or exit kernel processing within the OS using labels that identify the existing function and the patch function without halting the OS, wherein the transitioning threads processing includes using flags set on each of the threads that are initially set to access the existing function, and each flag is unset for each of the threads when each of the threads enter or exit the kernel processing of the OS, a thread of the threads having an unset flag identifying that said thread is to access the patch function.

9. The method of claim 8, wherein initiating further includes flushing caches associated with the multiple processors.

10. The method of claim 8, wherein loading further includes loading the patch function as a loadable module installable within the OS while the OS is executing on the multiple processors.

11. The method of claim 8, wherein transitioning further includes retiring the existing function from the OS once each thread has transitioned to the patch function.

12. The method of claim 8, wherein transitioning further includes migrating all the threads to the patch function while the OS is executing on the multiple processors.

13. The method of claim 12, wherein migrating further includes migrating all the threads to the patch function without halting the OS, without stopping the OS, and without rebooting the OS.

14. A system, comprising:
multiple hardware processors configured and cooperating to execute on a distributed server and to execute a distributed Operating System (OS); and
the OS, wherein the OS is configured to
i) uniquely label an existing function and a replacement function installed within the OS, and
ii) gradually transition threads from accessing the existing function to accessing the replacement function once any thread transitions enter or exit kernel processing within the OS using labels that identify the existing function and the replacement function without halting the OS, wherein the gradually transition threads includes using flags set on each of the threads that are initially set to access the existing function, and each flag is unset for each of the threads when each of the threads enter or exit the kernel processing of the OS, a thread of the threads having an unset flag identifying that said thread is to access the replacement function.

15. The server of claim 14, wherein the OS is further configured to iii) retire the existing function once all threads accessing the existing function are transitioned to the replacement function.

16. The server of claim 14, wherein the OS is further configured, in ii), to: gradually transition the threads from accessing the existing function to accessing the replacement function for the existing functions without halting the OS, without stopping the OS, and without rebooting the OS.

17. The server of claim 14, wherein the OS is further configured, in i), to: maintain consistency in the processing of the threads within the OS during migrating.

* * * * *

UNITED STATES PATENT AND TRADEMARK OFFICE
CERTIFICATE OF CORRECTION

PATENT NO. : 9,652,221 B2
APPLICATION NO. : 14/867819
DATED : May 16, 2017
INVENTOR(S) : Pavlík et al.

It is certified that error appears in the above-identified patent and that said Letters Patent is hereby corrected as shown below:

On the Title Page

In item (72), in "Inventor", in Column 1, Line 1, delete "Pavlik," and insert --Pavlík-- therefor In item (72), in "Inventor", in Column 1, Line 1, delete "Jiri," and insert --Jirí-- therefor In the Claims In Column 7, Line 47, in Claim 1, delete "treads" and insert --threads-- therefor Signed and Sealed this
Eleventh Day of June, 2019

Andrei Iancu
*Director of the United States Patent and Trademark Office*